(12) United States Patent
Boman et al.

(10) Patent No.: US 7,775,854 B1
(45) Date of Patent: Aug. 17, 2010

(54) WATER JET MACHINING WITH ABRASIVE RECOVERY AND FILTRATION

(75) Inventors: Jeffrey Boman, Cannon Falls, MN (US); David A. Schmitt, Hastings, MN (US); Gerald Svihel, Hastings, MN (US)

(73) Assignee: Gemini, Inc., Cannon Falls, MN (US)

( * ) Notice: Subject to any disclaimer, the term of this patent is extended or adjusted under 35 U.S.C. 154(b) by 276 days.

(21) Appl. No.: 11/781,417

(22) Filed: Jul. 23, 2007

(51) Int. Cl.
*B24B 49/00* (2006.01)
(52) U.S. Cl. .......................... 451/8; 451/88
(58) Field of Classification Search .............. 451/7, 451/87, 88
See application file for complete search history.

(56) References Cited

U.S. PATENT DOCUMENTS

| | | | | |
|---|---|---|---|---|
| 1,519,250 A | * | 12/1924 | Gelstharp | 209/5 |
| 3,122,863 A | * | 3/1964 | Millhiser et al. | 451/88 |
| 4,646,485 A | * | 3/1987 | Ashworth | 451/88 |
| 5,331,769 A | * | 7/1994 | Walton | 451/249 |
| 5,839,951 A | * | 11/1998 | Tomioka | 451/446 |
| 6,280,300 B1 | * | 8/2001 | Komatsu et al. | 451/87 |
| 6,299,510 B1 | * | 10/2001 | Massenburg | 451/38 |
| 6,328,638 B1 | * | 12/2001 | Hopkins et al. | 451/88 |
| 6,361,416 B1 | * | 3/2002 | Hopkins et al. | 451/88 |
| 6,375,547 B1 | * | 4/2002 | Massenburg | 451/38 |
| 6,514,128 B1 | * | 2/2003 | Lyras | 451/88 |
| 6,805,618 B1 | | 10/2004 | Ward et al. | |
| 7,052,378 B2 | | 5/2006 | Tateiwa et al. | |
| 2005/0202764 A1 | | 9/2005 | Tateiwa et al. | |
| 2006/0207927 A1 | | 9/2006 | Tirakian | |

* cited by examiner

*Primary Examiner*—Maurina Rachuba
(74) *Attorney, Agent, or Firm*—Haugen Law Firm PLLP; Frederick W. Niebuhr

(57) ABSTRACT

A continuous flow recirculating jet machining system incorporates a dynamic particle separator downstream of the fluid collection reservoir, for directing the water or other liquid in a serpentine path to promote separation of larger-diameter particulates. A filter bank downstream of the dynamic separator removes fine particles in several stages, providing several alternative fluid flow paths at each stage to facilitate filter replacement and other maintenance at each stage without interrupting system operation. The system further can incorporate a settlement tank between the dynamic separator and the filter bank to separate larger and intermediate sized particles upstream of the filter bank.

26 Claims, 3 Drawing Sheets

WATER JET MACHINING WITH ABRASIVE RECOVERY AND FILTRATION

BACKGROUND OF THE INVENTION

The present invention relates to fluid jet systems for cutting, polishing and other machining operations, and more particularly to closed loop fluid jet systems in which the fluid, typically water, is recirculated.

The fluid jet machining devices are frequently used to perform intricate and precise machining operations on solid materials like stone, masonry, steel and other metals. The devices employ high pressure pumps to supply water or another working fluid to a nozzle at pressures in the tens of thousands of pounds per square inch, while simultaneously providing a particulate abrasive such as garnet to the nozzle. The nozzle output is a fine, high-energy stream of the liquid and suspended abrasive. The stream, typically traveling at a velocity of several times the speed of sound, impinges upon a workpiece supported on a grate or other open-frame support structure. The workpiece is maintained stationery, while the nozzle guidance system dynamically controls the nozzle position and orientation relative to the workpiece to effect the desired machining operation.

Spent liquid and abrasive are collected in a reservoir positioned beneath the nozzle and workpiece. The larger abrasive particles tend to settle at and near the bottom of the reservoir, while smaller particles tend to remain suspended in the liquid. There are a variety of approaches to handling the spent liquid and abrasive, the simplest of which is to drain or pump away the liquid and particulate suspension, and shovel or otherwise remove the sediment as sludge or other solid waste. This approach involves considerable down time, and potential waste disposal problems, not only due to the abrasive but to workpiece particles and fragments that may include hazardous materials.

In an alternative approach, U.S. Pat. No. 6,299,510 (Massenburg) shows a fluid jet system in which water from the reservoir or catch tank is agitated by the stream from the nozzle to maintain more of the particulates in suspension, with the water then provided to a settling container. Water from the top of the settling container is relatively free of particles, and is circulated back to the catch tank. In a somewhat similar approach, published U.S. patent application Ser. No. 11/384,925 (Tirakian) shows a system in which a pump drawing water from a catch tank has a fluid collection housing, from which the water can be returned to the catch tank.

U.S. Pat. No. 6,328,638 (Hopkins et al.) discloses a fluid jet system with several recirculation stages, including a pre-classifier and a fine particle separation stage following the pre-classifier. Relatively clear water from each stage is recirculated to the catch tank.

U.S. Pat. No. 6,155,245 (Zanzuri) discloses a fluid jet cutting system with a fluid reservoir for collecting spent water and abrasive, noting that a drain for the reservoir in some instances can be connected to a fluid recycling structure to filter and pass the drained fluid back through the fluid pump and back into the nozzle to generate a continuous cutting cycle. While this is potentially advantageous from the standpoint of minimizing the need to supply outside water or other liquid to the system, the failure to provide extremely clean liquid to the high-pressure pump can damage the pump. In less severe cases, the water can accelerate wear to seals and other components to reduce the useful life of the pump.

Other pumps throughout the system, while not so sensitive as the high-pressure pump, are subject to severe wear when handling liquids laden with the larger abrasive particles and workpiece fragments. While filters can be employed at various stages to remove the coarser, larger-diameter particles, the periodic need to replace filters contributes to unwanted system down time.

Therefore, the present invention has several aspects, directed to one or more of the following objects:

to provide a fluid jet machining system in which spent abrasive, workpiece fragments, and other particulates are removed from the working liquid at minimal cost and with minimal disruption to the operation of the system;

to provide a system for removing the coarser, larger-diameter particles from the water or other working fluid recirculated in a fluid jet machining system, without exposing any of the pumps in the cycle to fluid laden with the coarser particles;

to provide a process for filtering finer, smaller-diameter particles from the working fluid in a fluid jet system while minimizing system down time; and to provide a simple, low cost and reliable system for treating the working fluid for recirculation to the high-pressure pump in a fluid jet device.

SUMMARY OF THE INVENTION

To achieve these and other objects, there is provided a fluid jet machining system. The system includes an open-frame workpiece support structure. A fluid jet source having a fluid jet discharge disposed above the workpiece support structure is adapted to direct a high-velocity fluid stream comprised of a liquid and a suspended particulate abrasive toward the workpiece support structure at a predetermined flow rate, causing the stream to impinge upon a workpiece supported by the support structure to perform a machining operation on the workpiece. A reservoir is disposed to receive the liquid and abrasive beneath the workpiece support structure. A continuous flow particulate abrasive separation stage is disposed downstream of the reservoir to receive the liquid and particulate abrasive at about the predetermined flow rate, and adapted to remove a relatively coarse larger-diameter portion of the particulate abrasive from the liquid as the liquid progresses through the continuous flow separation stage. A filtration device is disposed downstream of the continuous flow separation stage and has an entrance for receiving the liquid at about the predetermined flow rate, an exit for discharging the liquid at about that flow rate, and a plurality of alternative fluid flow paths between the entrance and the exit having respective filtration components. A flow directing system is operable to selectively and alternatively direct the liquid exclusively along different selected ones of the fluid flow paths, whereby the respective filtration components are operable alternatively to remove a relatively fine smaller-diameter portion of the particulate abrasive from the liquid.

The flow directing system can include a pressure-responsive controller. An upstream pressure sensor measures the liquid pressure upstream of the fluid flow paths, and a downstream pressure sensor measures a liquid pressure downstream of the fluid flow paths. When the sensed upstream and downstream pressures differ by more than a predetermined amount, the controller responds by directing the liquid flow to a different, alternate one of the fluid flow paths. This allows the system operator to change the filter or filters along the original flow path, with no interruption in the liquid flow through the filtration device and back to the high-pressure pump. Later, when the controller senses a pressure difference indicating that the filter or filters in the alternate fluid flow path should be changed, the controller redirects the liquid flow path through the original fluid flow path. Thus, two alternative fluid flow paths can eliminate the need for down time to change filters. Additional flow paths can be provided for more redundancy.

In preferred versions of the system, a settling tank is disposed between the continuous flow separation stage and the filtration device. The settling tank is adapted to hold a large volume of the liquid for an extended time, to facilitate a substantially static separation of an intermediate-diameter portion of the abrasive from the liquid by gravity. This better insures that the liquid entering the filtration device is substantially free of larger particles that might prematurely diminish the capacity of the fine particle filters disposed along the alternative fluid flow paths.

Another aspect of the present invention is a continuous flow gravitational separation system for use with fluid jet machining device. The separation system includes a container. A plurality of barriers divide the container into a series of horizontally spaced apart compartments, including an upstream compartment adapted to receive a liquid flow from a fluid jet machining device at a predetermined liquid flow rate, a downstream compartment for discharging the liquid at about the predetermined liquid flow rate, and a plurality of intermediate compartments for accommodating a substantially non-turbulent flow of the liquid between the upstream compartment and the downstream compartment. The barriers include a plurality of first barriers open at the bottom to confine an inter-compartmental flow of the liquid to a lower region near the bottom of each adjacent compartment, and a plurality of second barriers open at the top to confine the inter-compartmental flow to an upper region near the top of each adjacent compartment. The first and second barriers are arranged in alternating fashion.

This arrangement channels the working liquid into a serpentine flow path in which adjacent upward flows and downward flows are joined by relatively abrupt reversals in flow direction. In the reversals that occur along the bottom of the container, namely changes from a downward flow to an upward flow, the coarser, larger-diameter particles are less prone to follow the liquid flow. Due to gravity and particle momentum, these larger particles tend to continue their downward course and remain near the container bottom. The comparative impact of gravity and momentum varies with the linear velocity of the liquid flow, which preferably is a laminar flow. In any event, the container width and the height of the barriers that define the lower regions are selected to provide a desired linear fluid velocity in relation to the volumetric flow rate of the liquid, typically about one gallon per minute.

As the coarse particles continue to become separated from the liquid flow, the particle concentration near the first barriers increases. To remove the particle-laden liquid from the container, it is useful to provide a series of openings along the container bottom, one associated with each first barrier. A pump, acting through a manifold coupled to the openings, is used to remove the particle-laden liquid.

Another aspect of the invention is a process for treating liquid used in a fluid jet machining system, including:

(a) collecting a liquid product generated by a nozzle assembly during a fluid jet machining operation, the liquid product including a liquid and abrasive particles suspended in the liquid; and (b) guiding the collected liquid product in a substantially non-turbulent flow at a substantially constant liquid flow rate along a flow path incorporating a plurality of troughs at which a direction of the flow is altered from substantially downward to substantially upward, while selecting the liquid flow rate to facilitate a separation of a relatively coarse larger-diameter portion of the particles by gravity and momentum from the substantially non-turbulent flow at the troughs.

Preferably the process further includes directing the liquid from the downstream end of the flow path through a filtration assembly to remove a relatively fine smaller-diameter portion of the particles from the liquid. According to this arrangement the filtration assembly, and a pump used to transport liquid from the downstream end of the flow path to the filtration assembly, are not exposed to the relatively coarse larger-diameter portion of the particles. This improves the efficiency of the filtration assembly and increases the useful life of the pump.

According to another preferred version of the process, the liquid transported from the downstream end of the flow paths toward the filtration assembly is maintained for a predetermined time in a settling tank disposed upstream of the filtration assembly. This promotes gravitational settling to remove an intermediate-diameter portion of the particles from the liquid, further increasing the filtration assembly efficiency, and further increasing the life of any pump handling the liquid flow downstream of the settling tank.

The filtration assembly preferably is provided in several stages, e.g. to remove particles having diameters above 25 microns, above 10 microns, and above 5 microns, so that water leaving the filtration assembly incorporates only particles in the low micron and submicron range. Water downstream of the filtration assembly preferably is cooled, and can be softened and/or treated to remove dissolved solids. As a result, the water can be provided to the high-pressure pump for reuse in further fluid jet machining operations.

Thus, in accordance with the present invention, the water or other working liquid in a fluid jet machining system is treated at several stages to remove successively finer portions of suspended abrasive and other particulate matter. The initial stage utilizes a liquid flow induced by gravity, and the use of filters is restricted to the final stages, thus to increase filtration efficiency and extend the useful life of pumps disposed between successive stages.

IN THE DRAWINGS

For a further understanding the foregoing features and advantages, reference is made to the following detailed description and to the drawings, in which.

DETAILED DESCRIPTION OF THE PREFERRED EMBODIMENTS

Figure 1:
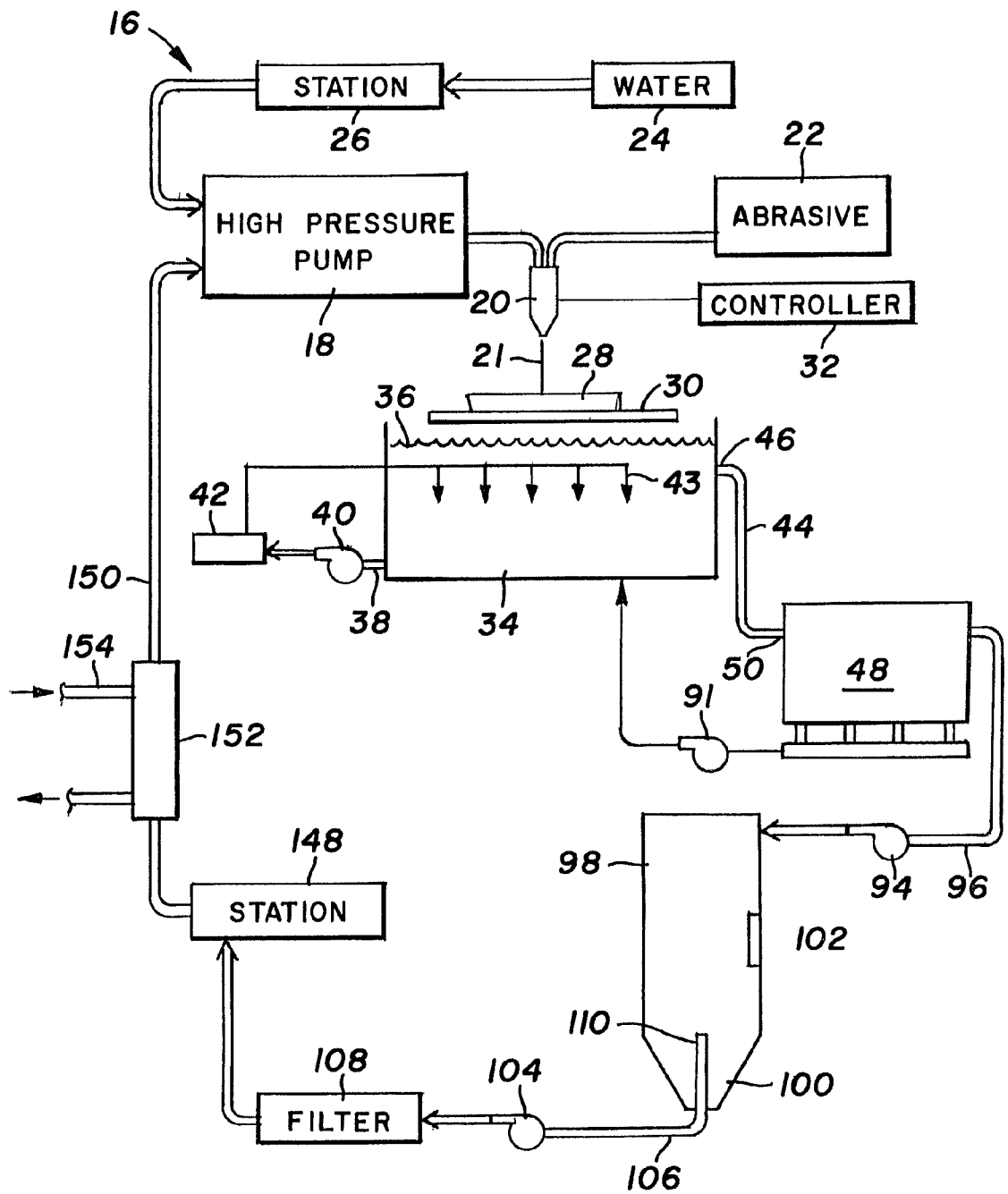
FIG. 1 is a schematic view of a fluid jet machining system configured in accordance with the present invention.

Turning now to the drawings, there is shown in FIG. 1 a recirculating fluid jet system 16 that employs a high speed liquid stream to perform precision cutting and other machining operations on workpieces formed of stone, masonry, steel and other metals. The liquid, usually water, is supplied from a high-pressure pump 18 to a nozzle 20 at a high pressure, e.g. in the range of 60,000 psi. The water is directed by a small diameter (e.g. 0.050 inches) nozzle orifice, and emerges from the nozzle as a narrowly focused liquid cutting stream 21 traveling at several times the velocity of sound. An abrasive source 22 is coupled to nozzle 20 for providing a particulate abrasive, usually garnet, for merger with the water along the nozzle orifice. The water and abrasive are supplied to nozzle 20 at substantially constant rates, to generate the cutting stream at a selected constant proportion of water to suspended particulate abrasive. The water and abrasive leave nozzle 20 at a predetermined constant flow rate, e.g. about one gallon per minute including the abrasive conveyed at about one pound per minute.

Pump 18 receives water from a source 24, typically a municipal water supply. On the way to the pump, the water is directed through a water treatment station 26, which may include a water softening stage, and at least one further stage to remove suspended solids from the water. This extends the useful life of high-pressure pump 18, which typically is subject to strict requirements for water purity.

Nozzle 20 is operated to perform machining operations on a workpiece 28, supported below the nozzle on a grid 30 or other open-frame support structure. Precision cutting and other operations require tight control of the nozzle position, direction of movement and a velocity relative to the workpiece. To this end, nozzle 20 is guided by a controller 32. The controller can include mutually perpendicular sets of horizontal rails or rods movable to control horizontal movement of nozzle, and may include further components for controlling vertical movement and orientation of the nozzle. These components are known to those skilled in the art.

Spent water and garnet are collected in a catch tank or reservoir 34 located beneath grid 30. As indicated at 36, reservoir 34 is maintained substantially filled to a relatively high water level. Larger and higher density particles tend to settle near the bottom of the reservoir, although suspended particles, including the abrasive and workpiece particles, remain distributed throughout the water. A conduit 38 is fluid coupled to the interior of reservoir 34 at a point near the bottom of the reservoir. A centrifugal pump 40 along the conduit is operated periodically to remove particle laden water and convey it to a collection site 42 for disposal or for drying to recover spent abrasive. Water from site 42 is recirculated to reservoir 34 through eductors 43 to agitate the water and keep more of the particles in suspension.

A conduit 44 is fluid coupled to the reservoir interior at a location 46 above the coupling location of conduit 38, preferably level with the surface 36 of the water. Conduit 44 is used to convey water and suspended abrasive by gravity (siphoning) to a weir tank 48, preferably at or near the one gallon per minute cutting stream flow rate. To influence the flow rate through conduit 44, weir tank 48 is mounted in a manner that allows adjusting its height relative to reservoir 34, to alter the vertical separation and thus the pressure head between location 46 and a location 50 where conduit 44 provides the water to the weir tank.

Figure 2:
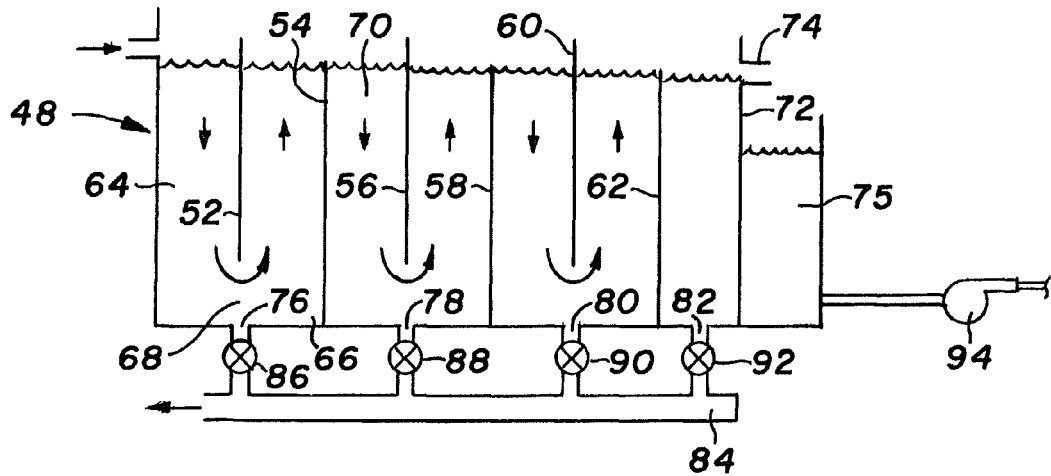
FIG. 2 is a more detailed schematic view of an abrasive separation tank of the system.

Weir tank 48 is rectangular, and as seen in FIG. 2, is divided into a series of substantially equally spaced apart compartments by barriers 52, 54, 56, 58, 60 and 62. Barriers 52, 56 and 60 are elevated to prevent the water and suspended abrasive from flowing over them, and to provide respective rectangular passages between the barriers and the bottom of tank 48 to permit inter-compartmental flow. For example, the water flows from upstream compartment 64 into the adjacent compartment 66 through a passage 68.

Barriers 54, 58 and 62 are closed at the bottom of the tank, and are not as high as the other barriers. These barriers function as weirs, allowing the water and suspended abrasive to spill over from one compartment into the next compartment downstream, e.g. from compartment 66 to the next downstream compartment 70. The heights of these barriers preferably are progressively reduced in the downstream direction.

Preferably, the water and suspended abrasive travel through weir tank 48 in a laminar, non-turbulent flow at or near the one gallon per minute flow rate. The fluid moves in a somewhat serpentine path, in repeating cycles that include a downward flow, a relatively abrupt reversal in flow direction along each of passages 68, an upward flow to the top of the adjacent barrier that serves as a weir, and a spilling into the next adjacent downstream compartment to resume a downward flow. This pattern is altered at a downstream compartment 72 where liquid spilling over barrier 62 at first fills compartment 72, then flows, substantially at the 1 gpm system flow rate through passage 74 into a compartment 75.

Weir tank 48 thus effects a dynamic or steady state separation of suspended particles as the water proceeds along the serpentine path. Most of the separation occurs along the passages beneath barriers 52, 56 and 60, where the larger particles are less likely to follow the flow reversals, instead tending to continue their descent due to gravity and particle momentum. Smaller particles, and particles having less density, tend to remain suspended and follow the flow reversals. As noted above, water flowing into compartment 72 tends to flow into a compartment 75 rather than downwardly into compartment 72 once this compartment is full, as shown. Particles settle in compartment 72, but in a manner more like the separation that occurs in standard settling tanks.

The dynamic separation that occurs throughout weir tank 48 tends to remove the coarser, larger-diameter particles from the water, e.g. particles having diameters of about 0.002 inches to 0.003 inches. For convenient removal of these larger particles, tank 48 is provided with several openings near the bottom, including openings 76, 78 and 80 along respective passages 68, and an opening 82 at the bottom of compartment 72. Openings 76, 78, 80 and 82 are fluid coupled to a manifold 84 through respective ball valves 86, 88, 90 and 92. Each ball valve is operable alternatively to drain particle-laden water through its associated opening to manifold 84, and to close its associated opening to maintain the full flow of water along the serpentine path through the weir tank. The ball valves can be opened from time to time during system operation, individually or in unison.

A diaphragm pump 91 (FIG. 1) conveys particle laden water from manifold 84 back to catch tank 34. A float-controlled sump pump 94 moves water at about the 1 gpm system flow rate through a conduit 96 from weir tank 48 to a settling tank 98. The capacity of tank 98, e.g. 500 gallons, is sufficiently large to insure that the water, although moving at the system flow rate, remains in the settling tank for a considerable time (for example, 24 hours) in an essentially static state. This promotes a gravitational separation of abrasive and workpiece particles by settlement to a conical bottom region 100 of the tank. The gravitational settlement is effective for removing coarser, larger-diameter particles not removed when passing through weir tank 48. Further, due to the extended time for settlement, particles with diameters in the range of about 50 microns to about 1 mm, conveniently thought of as intermediate particles, also are separated from the liquid. In any event, the particles tend to accumulate in bottom region 100, leaving the water above the bottom region comparatively clear. An ozone generator 102 is used to inject ozone into the water inside tank 98, to minimize or eliminate contamination due to bacterial agents.

A diaphragm pump 104 is provided along a conduit 106 for conveying the water from settling tank 98, preferably at about the system flow rate, to a filter bank 108. At its upstream end, conduit 106 forms a riser 110. The riser is open to the settling tank interior at a point above bottom region 100, to insure that relatively clear water is provided to the filter bank.

Figure 3:
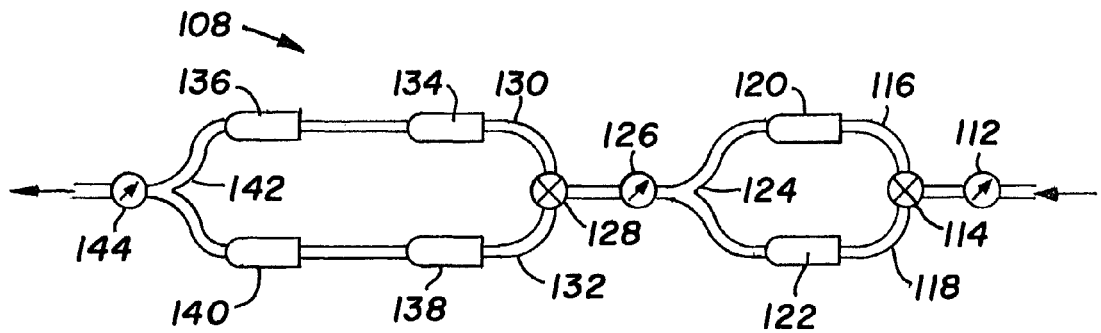
FIG. 3 is a more detailed schematic view of a filtration device of the system.

As seen in FIG. 3, filter bank 108 includes two distinct stages, each stage having two alternative liquid flow paths. Fluid entering the filter bank first encounters a pressure gauge 112, then proceeds to a three-way valve 114 for direction to a conduit 116, and alternative conduit 118, or to be prevented from flowing further if valve 114 is in the "off" position. Fluid directed to conduit 116 flows through a 25 micron filter 120, while fluid formed along conduit 118 passes through a 25 micron filter 122.

Conduits 116 and 118 merge at a junction 124 to direct flow through a pressure gauge 126 between the upstream and downstream stages of the filtration bank.

From gauge 126, the fluid proceeds to a three-way valve 128 for further flow, alternatively, to a conduit 130 and an alternative conduit 132. Fluid flowing along conduit 130 pass through a 10 micron filter 134 and a downstream 5 micron filter 136. Similarly, fluid in conduit 132 flows through a 10 micron filter 138 and a 5 micron filter 140. Water from either conduit flows through a junction 142 to a downstream pressure gauge 144. When valves 114 and 128 are open, water flows through filter bank 108 at about the 1 gpm system flow rate, as governed by pump 104.

Thus, filter bank 108 separates fine particles from the water in two stages. In the upstream stage, filter 120 (or filter 122) traps particles having diameters above 25 microns. Along the downstream stage, filter 134 (or filter 138) traps particles having diameters above 10 microns, while downstream filter 136 (or filter 140) traps particles with diameters above 5 microns.

Each stage incorporates alternative fluid flow paths, to allow maintenance along one of the paths (for example changing a filter) while the water is directed along the other fluid flow path. Accordingly, the operator can perform such maintenance without interrupting or disturbing the fluid flow. Thus, system 16 can be operated continuously regardless of the need for routine, periodic replacement of the filters, and in many cases in spite of any unanticipated loss of or reduction in filtration efficiency.

As any one of the filters continues to trap particles, the accumulation of particulate material eventually begins to impede passage of liquid through the filter, leading to an increased pressure differential in fluid upstream and downstream of the filter. The continued accumulation of particulate matter, if unattended, interferes with the flow of fluid through the system. Gauges 112, 126, and 144, along with valves 114 and 128, cooperate to provide a flow directing system designed to prevent excess particulate accumulation in filter bank 108.

The system operator keeps track of the respective pressure readings of the gauges, paying particular attention to the difference between the pressure readings of gauges 112 and 126 with reference to the upstream stage, and to the difference between gauges 126 and 144 with reference to the downstream stage. For example, upon observing that a pressure difference between gauges 112 and 126 is increasing toward an unacceptable level, the operator adjusts valve 114 to redirect the liquid flow from conduit 116 to conduit 118 (or vise versa). With the flow redirected, the operator can replace the filter involved, in this case filter 120 (or 122). In the same manner, an excessive difference in the pressure readings of gauges 126 and 144 informs the operator to use valve 128 to redirect the liquid flow from conduit 130 to conduit 132 (or vise versa). After redirection of the flow, the appropriate filters (i.e. filters 134 and 136 or filters 138 and 140) are inspected and replaced if necessary.

Figure 4:
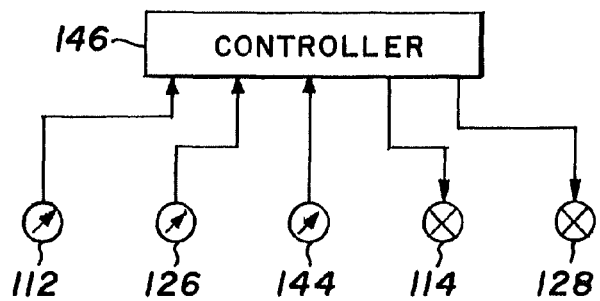
FIG. 4 shows a controller and associated components of the filtration device.

In certain systems, it may be desirable to provide for automatic redirection of the liquid flow through the filter bank. To this end, filter bank 108 advantageously incorporates a controller 146 (FIG. 4) adapted to receive inputs from gauges 112, 126 and 144. Using these inputs, controller 146 determines upstream stage and downstream stage fluid pressure differentials, i.e. the differences in readings between gauges 112 and 126, and between gauges 126 and 144, respectively.

Figure 5:
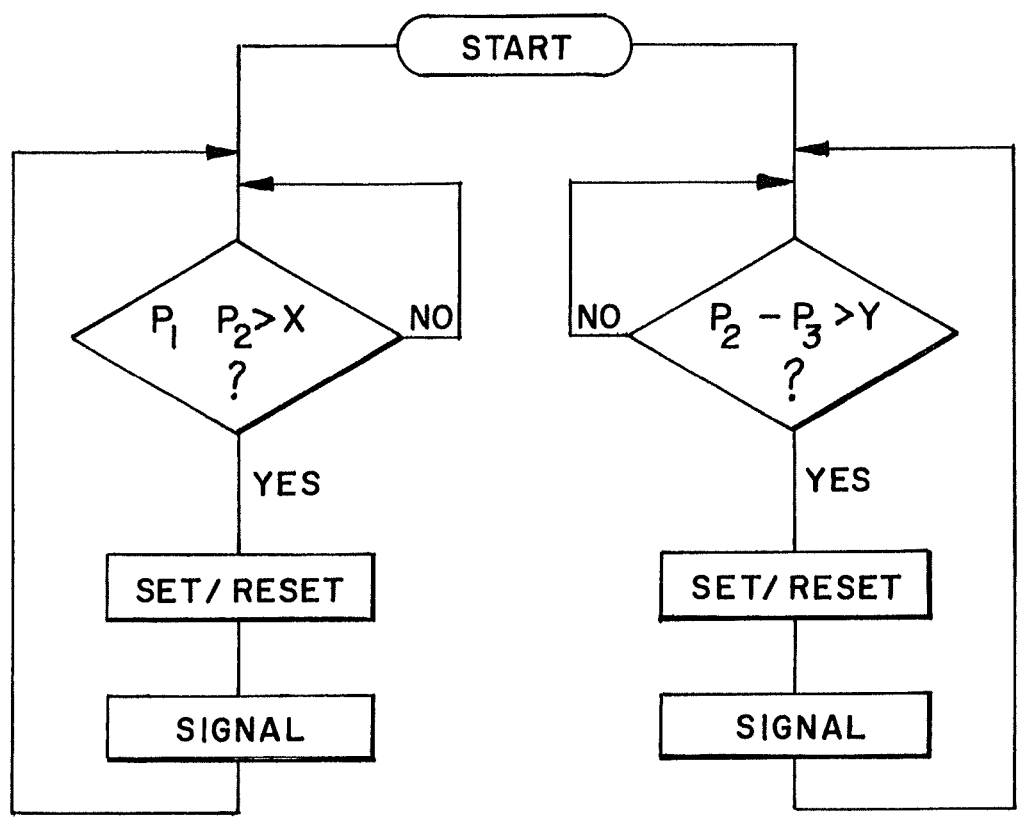
FIG. 5 is a flow chart illustrating the operation of the filtration device.

FIG. 5 is a diagram showing the valve control logic of controller 146. With respect to the upstream stage of filter bank 108, the logic begins with repeated sampling of a pressure reading $P_1$ from pressure gauge 112, and a pressure reading $P_2$ from pressure gauge 126. So long as the difference between $P_1$ and $P_2$ remains at or below a predetermined threshold X, no action is necessary.

When the difference between $P_1$ and $P_2$ exceeds X, controller 146 sets valve 114, redirecting the fluid flow from an "original" one of conduits 116 and 118 to the alternate conduit. Substantially simultaneously, controller 146 can generate a set indication, i.e. a visible or audible signal, to inform the system operator of the change in fluid flow paths.

At that point, sampling of pressure reading $P_1$ and $P_2$ is resumed. When the differential again exceeds the threshold, valve 114 is reset to direct the fluid flow to original conduit, where the system operator has changed the filter or performed the required maintenance.

Controller 146 governs the setting and resetting of downstream valve 128 in the same fashion. The setting and resetting of valve 128 is based on the difference between reading $P_2$ and a pressure reading $P_3$ of pressure gauge 144, with setting and resetting triggered by pressure differences that exceed a threshold Y that may be equal to or different then threshold X. In either event, the downstream stage is controlled independently of the upstream stage.

Returning to FIG. 1, filtered water leaving filter bank 108 is directed to a water treatment station 148, which can include a water softening stage for removing dissolved solids present in the water. This increases the life of the seals in high-pressure pump 18.

Water from treatment station 148 is returned to along a conduit 150 to high-pressure pump 18 for recirculation through system 16. A tube-in-shell heat exchanger 152 is disposed along conduit 150 for cooling the water as it is conveyed along conduit 150. A conduit 154 conducts a liquid cooling medium to and along the heat exchanger. The cooling medium can be water from source 24 or elsewhere, or can be a solution of ethylene glycol and water circulated within a refrigeration system. In either event, the same cooling medium can be used to cool high-pressure pump 18.

Water from source 24 is required from time to time to replenish system 16 due to losses, for example from reservoir 34, from weir tank 48 through manifold 84, and due to evaporation throughout the system. Nonetheless, recirculation can provide over 90 percent of the water required by nozzle 20, considerably reducing the amount of water required by system 16 compared to previous systems.

Thus in accordance with the present invention, a fluid jet system is provided with multiple stages of particulate separation and filtration, each of which is fully functional while the system is in use. As a result, the system can be operated continuously, with no down time required for removal of spent abrasive or other particulate material. A gravity-effected dynamic separation stage removes larger particulates, so that pumps can be located downstream of the dynamic separator to avoid the excessive wear that accompanies exposure to the larger particles. Filtration components are disposed downstream of the separator, and arranged to provide alternative filtration paths so that filters can be changed without interrupting liquid flow through the system.

What is claimed is:

1. A fluid jet machining system, including:
   an open-frame workpiece support structure;
   a fluid jet source having a fluid jet discharge disposed above the workpiece support structure and adapted to direct a high-velocity fluid stream comprised of the liquid and a suspended particulate abrasive toward the workpiece support structure at a predetermined flow rate, causing the stream to impinge upon a workpiece supported by the support structure to perform a machining operation on the workpiece;
   a reservoir disposed to receive the liquid and abrasive beneath the workpiece support structure;
   a continuous flow particulate abrasive separation stage disposed downstream of the reservoir to receive the liquid and particulate abrasive at about the predetermined flow rate, and adapted to remove a relatively coarse larger-diameter portion of the particulate abrasive from the liquid as the liquid progresses through the continuous flow separation stage;
   wherein the continuous flow separation stage comprises a container and a plurality of barriers that divide the container into a series of horizontally spaced apart compartments, and the barriers are alternatively comprised of first barriers open at the top to confine inter-compartmental flow of the liquid to an upper region near the tops of the compartments, and second barriers open at the bottom to confine the inter-compartmental flow to a lower region near the bottoms of the compartments;
   a filtration device disposed downstream of the continuous flow separation stage and having an entrance for receiving the liquid at about said predetermined flow rate, an exit for discharging the liquid at about said flow rate, and a plurality of alternative fluid flow paths between the entrance and the exit having respective filtration components; and
   a flow directing system operable to selectively and alternatively direct the liquid exclusively along different selected ones of the fluid flow paths, whereby the respective filtration components are operable alternatively to remove a relatively fine smaller-diameter portion of the particulate abrasive from the liquid.

2. The system of claim 1 further including:
   a settling tank disposed between the continuous flow separation stage and the filtration device for containing the liquid to facilitate a substantially static separation of an intermediate-diameter portion of the particulate abrasive from the liquid by gravity.

3. The system of claim 2 further including:
   an ozone generator disposed in the settling tank.

4. The system of claim 1 further including:
   a first pressure sensor for measuring a first pressure of the liquid upstream of the alternative fluid flow paths, and a second pressure sensor for measuring a second pressure of the liquid downstream of the alternative fluid flow paths;
   wherein the flow directing system comprises a controller adapted to direct the liquid flow from one of the fluid flow paths to another one of the fluid flow paths in response to detection of a difference between the first and second pressures that exceeds a predetermined threshold.

5. The system of claim 1 further including:
   a fluid conduit for conducting the liquid from the exit of the filtration device to the fluid jet source, and a cooling means for cooling the liquid as it travels along the fluid conduit.

6. The system of claim 5 further including:
   a liquid treatment stage along the fluid conduit for removing dissolved elements from the liquid.

7. The system of claim 1 wherein:
   the barriers form an alternating arrangement of the first barriers and the second barriers.

8. The system of claim 1 wherein:
   the filtration device comprises an upstream stage for removing particles having at least a first diameter from the liquid, and a downstream stage for removing particles having at least a second diameter less than the first diameter; and
   each of the stages includes at least two of the alternative fluid flow paths.

9. The system of claim 8 further including:
   a first pressure sensor for measuring a first pressure of the liquid upstream of the first filtration stage, a second pressure sensor for measuring a second pressure of the liquid between the first stage and the second stage, and a third pressure sensor for measuring a third pressure of the liquid downstream of the second stage;
   wherein the flow directing system comprises a controller adapted to direct the liquid flow from one of the fluid flow paths of the first stage to another one of the fluid flow paths of the first stage in response to sensing a pressure difference between the first pressure and second pressure that exceeds a predetermined first threshold, and further is adapted to direct the liquid flow from one of the fluid flow paths of the second stage to another one of the fluid flow paths of the second stage in response to sensing a pressure difference between the second pressure and the third pressure that exceeds a predetermined second threshold.

10. The system of claim 1 wherein:
    the horizontally spaced apart compartments comprise an upstream compartment adapted to receive the liquid from the reservoir at about the predetermined flow rate, a downstream compartment for discharging the liquid at about the predetermined flow rate, and a plurality of intermediate compartments for accommodating a substantially non-turbulent flow of liquid between the upstream compartment and the downstream compartment.

11. The system of claim 10 wherein:
    the container has a container length in a substantially horizontal length direction and a container width, less than the container length, in a substantially horizontal width direction;
    the barriers extend across the container in the container width direction; and
    the barriers are spaced apart from one another in the container length direction.

12. The system of claim 10 further including:
    a plurality of openings in the container along a bottom thereof, each of the openings being disposed proximate an associated one of the second barriers.

13. The system of claim 12 further including:
    a manifold fluid coupled to said openings.

14. The system of claim 13 further including:
    a pump in fluid communication with the manifold and the reservoir, adapted to return particle laden liquid from the manifold to the reservoir.

15. The system of claim 12 further including:
a plurality of valves, one of the valves associated with each of the openings and operable to selectively open and close its associated opening.

16. The system of claim 10 further including:
a pump fluid coupled to the downstream compartment for drawing the liquid out of the container substantially at the predetermined flow rate.

17. The system of claim 10 wherein:
the upstream compartment is fluid coupled to receive the liquid from the reservoir by gravitational flow.

18. The system of claim 1 wherein:
the first barriers are adapted to function as weirs to allow the liquid to spill over from a given one of the compartments into the next compartment downstream.

19. The system of claim 18 wherein:
the heights of the first barriers progressively diminish in the downstream direction.

20. A fluid jet machining system, including:
an open-frame workpiece support structure;
a fluid jet source having a fluid jet discharge disposed above the workpiece support structure and adapted to direct a high-velocity fluid stream comprised of the liquid and a suspended particulate abrasive toward the workpiece support structure at a predetermined flow rate, causing the stream to impinge upon a workpiece supported by the support structure to perform a machining operation on the workpiece;
a reservoir disposed to receive the liquid and abrasive beneath the workpiece support structure;
a continuous flow particulate abrasive separation stage disposed downstream of the reservoir to receive the liquid and particulate abrasive at about the predetermined flow rate, and adapted to remove a relatively coarse larger-diameter portion of the particulate abrasive from the liquid as the liquid progresses through the continuous flow separation stage;
a filtration device disposed downstream of the continuous flow separation stage and having an entrance for receiving the liquid at about said predetermined flow rate, an exit for discharging the liquid at about said flow rate, and a plurality of alternative fluid flow paths between the entrance and the exit having respective filtration components;
a flow directing system operable to selectively and alternatively direct the liquid exclusively along different selected ones of the fluid flow paths, whereby the respective filtration components are operable alternatively to remove a relatively fine smaller-diameter portion of the particulate abrasive from the liquid; and
a fluid conduit for conducting the liquid from the exit of the filtration device to the fluid jet source, and a cooling means for cooling the liquid as it travels along the fluid conduit.

21. The system of claim 20 further including:
a liquid treatment stage along the fluid conduit for removing dissolved elements from the liquid.

22. The system of claim 20 wherein:
the filtration device comprises an upstream stage for removing particles having at least a first diameter from the liquid, and a downstream stage for removing particles having at least a second diameter less than the first diameter; and
each of the stages includes at least two of the alternative fluid flow paths.

23. The system of claim 20 further including:
a settling tank disposed between the continuous flow separation stage and the filtration device for containing the liquid to facilitate a substantially static separation of an intermediate-diameter portion of the particulate abrasive from the liquid by gravity.

24. A fluid jet machining system, including:
an open-frame workpiece support structure;
a fluid jet source having a fluid jet discharge disposed above the workpiece support structure and adapted to direct a high-velocity fluid stream comprised of the liquid and a suspended particulate abrasive toward the workpiece support structure at a predetermined flow rate, causing the stream to impinge upon a workpiece supported by the support structure to perform a machining operation on the workpiece;
a reservoir disposed to receive the liquid and abrasive beneath the workpiece support structure;
a continuous flow particulate abrasive separation stage disposed downstream of the reservoir to receive the liquid and particulate abrasive at about the predetermined flow rate, and adapted to remove a relatively coarse larger-diameter portion of the particulate abrasive from the liquid as the liquid progresses through the continuous flow separation stage;
a filtration device disposed downstream of the continuous flow separation stage and having an entrance for receiving the liquid at about said predetermined flow rate, an exit for discharging the liquid at about said flow rate, and a plurality of alternative fluid flow paths between the entrance and the exit having respective filtration components;
a first pressure sensor for measuring a first pressure of the liquid upstream of the alternative fluid flow paths, and a second pressure sensor for measuring a second pressure of the liquid downstream of the alternative fluid flow paths; and
a flow directing system operable to selectively and alternatively direct the liquid exclusively along different selected ones of the fluid flow paths, whereby the respective filtration components are operable alternatively to remove a relatively fine smaller-diameter portion of the particulate abrasive from the liquid, the flow directing system comprising a controller adapted to direct the liquid flow from one of the liquid flow paths to another one of the flow paths in response to detection of a difference between the first and second pressures that exceeds a predetermined threshold.

25. The system of claim 24 further including:
a settling tank disposed between the continuous flow separation stage and the filtration device for containing the liquid to facilitate a substantially static separation of an intermediate-diameter portion of the particulate abrasive from the liquid by gravity.

26. The system of claim 24 further including:
a fluid conduit for conducting a liquid from the exit of the filtration device to the fluid jet source, and a cooling means for cooling the liquid as it travels along the fluid conduit.

* * * * *